Figure 1:
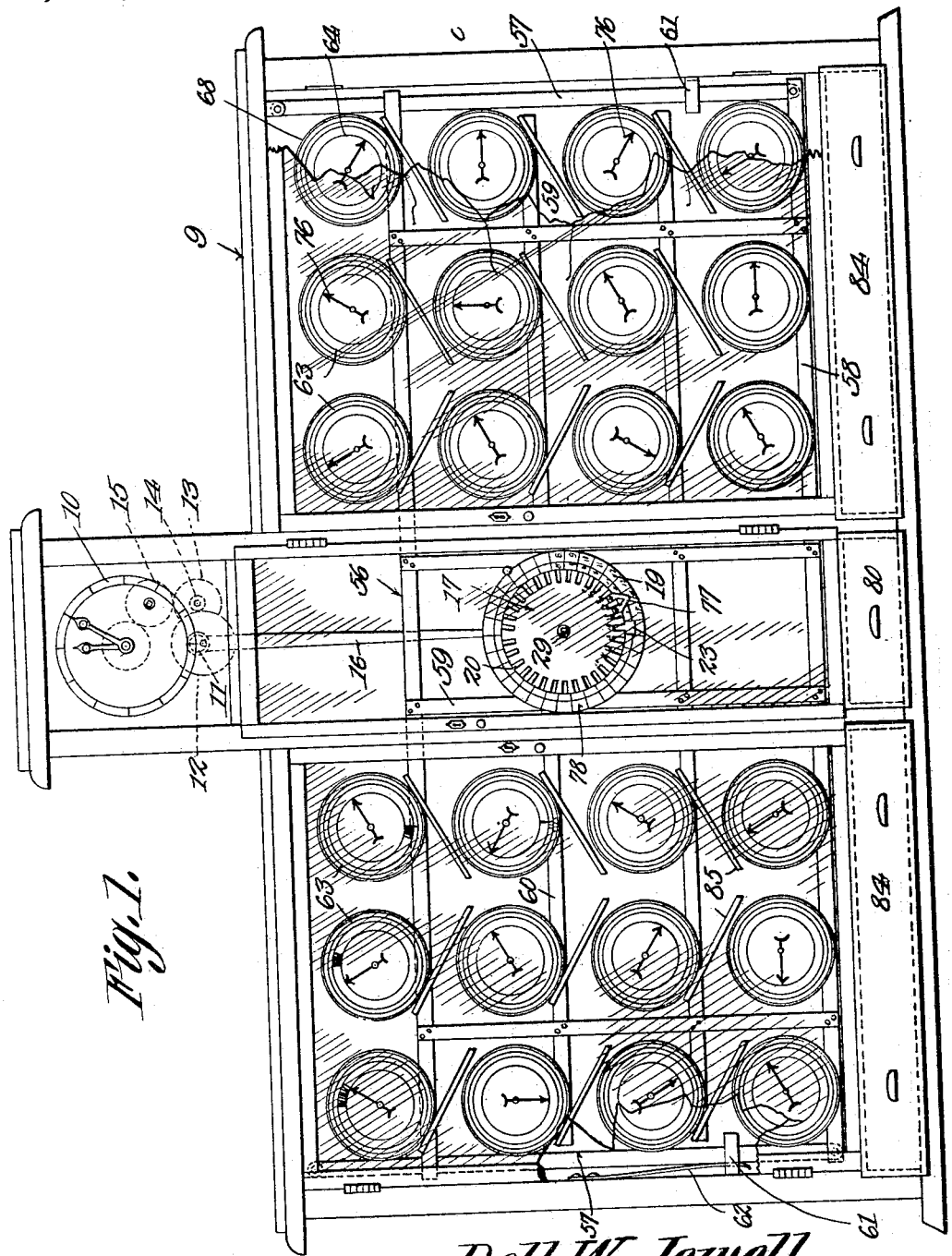

D. W. JEWELL.
AUTOMATIC MECHANISM FOR RECALLING CHRONOLOGICAL DATA
APPLICATION FILED FEB. 18, 1914.

1,117,675.

Patented Nov. 17, 1914.
4 SHEETS—SHEET 1.

Witnesses

Dell W. Jewell, Inventor,
by C. A. Snow & Co.
Attorneys.

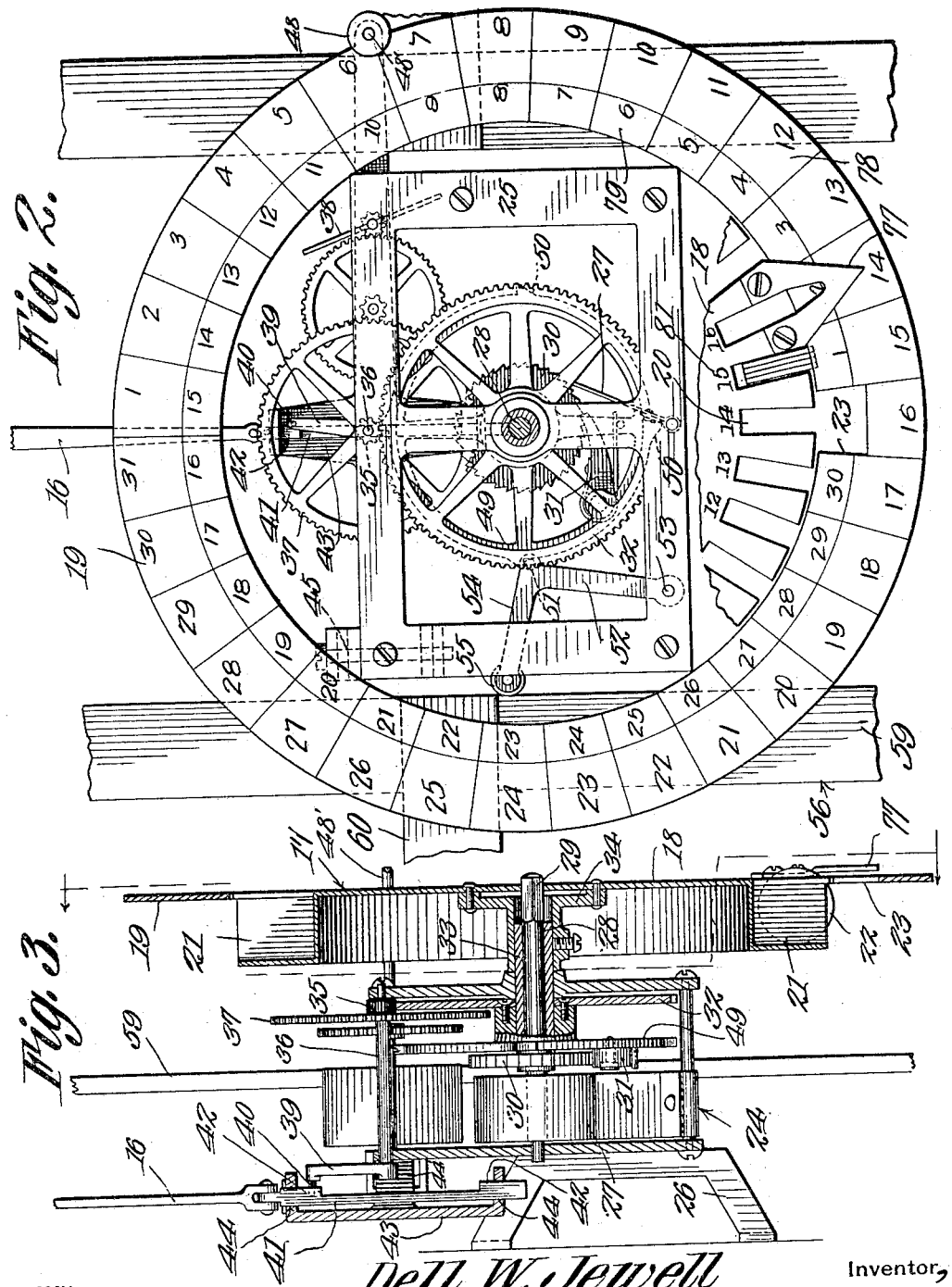

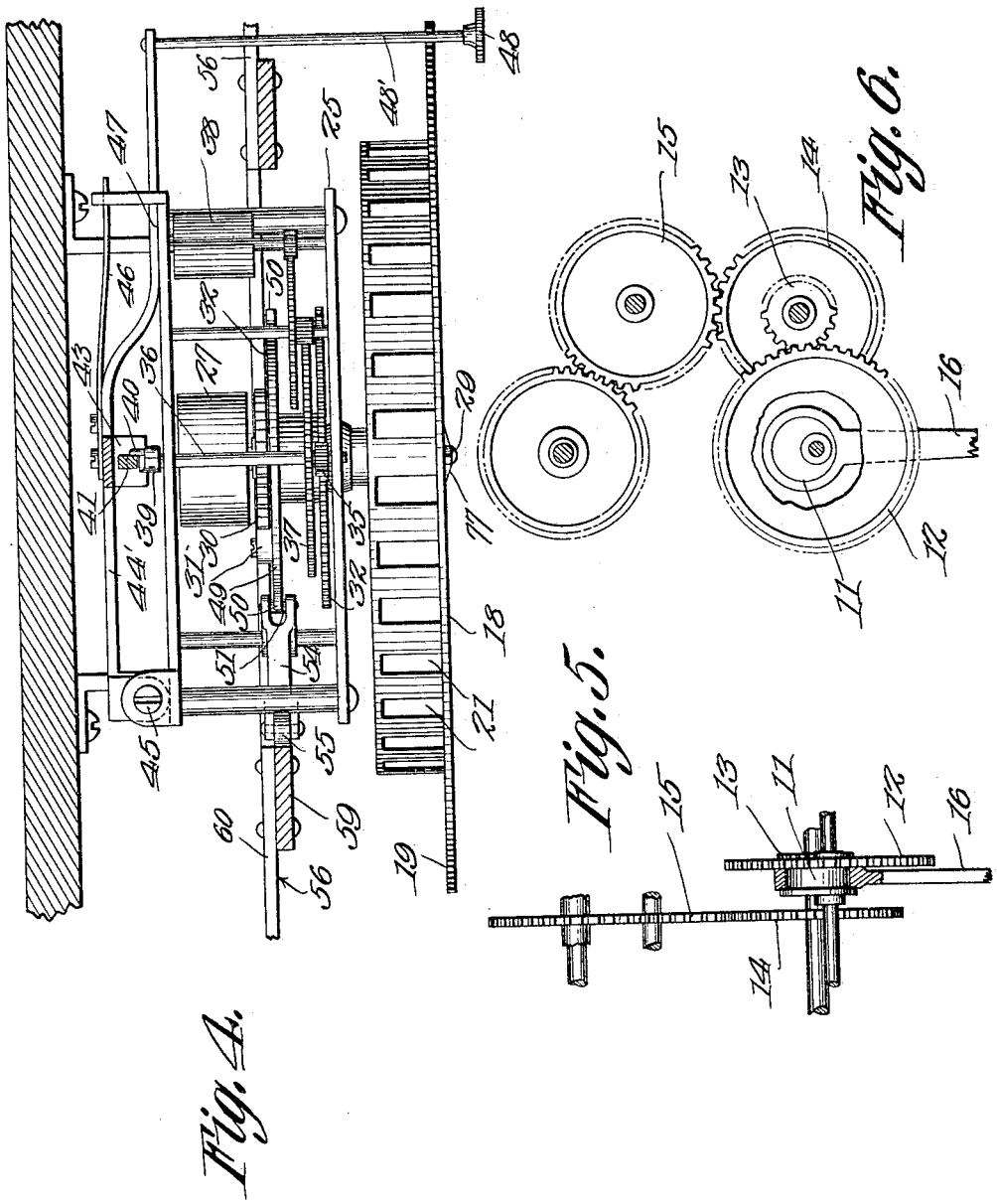

D. W. JEWELL.
AUTOMATIC MECHANISM FOR RECALLING CHRONOLOGICAL DATA.
APPLICATION FILED FEB. 18, 1914.
1,117,675.
Patented Nov. 17, 1914.
4 SHEETS—SHEET 4.
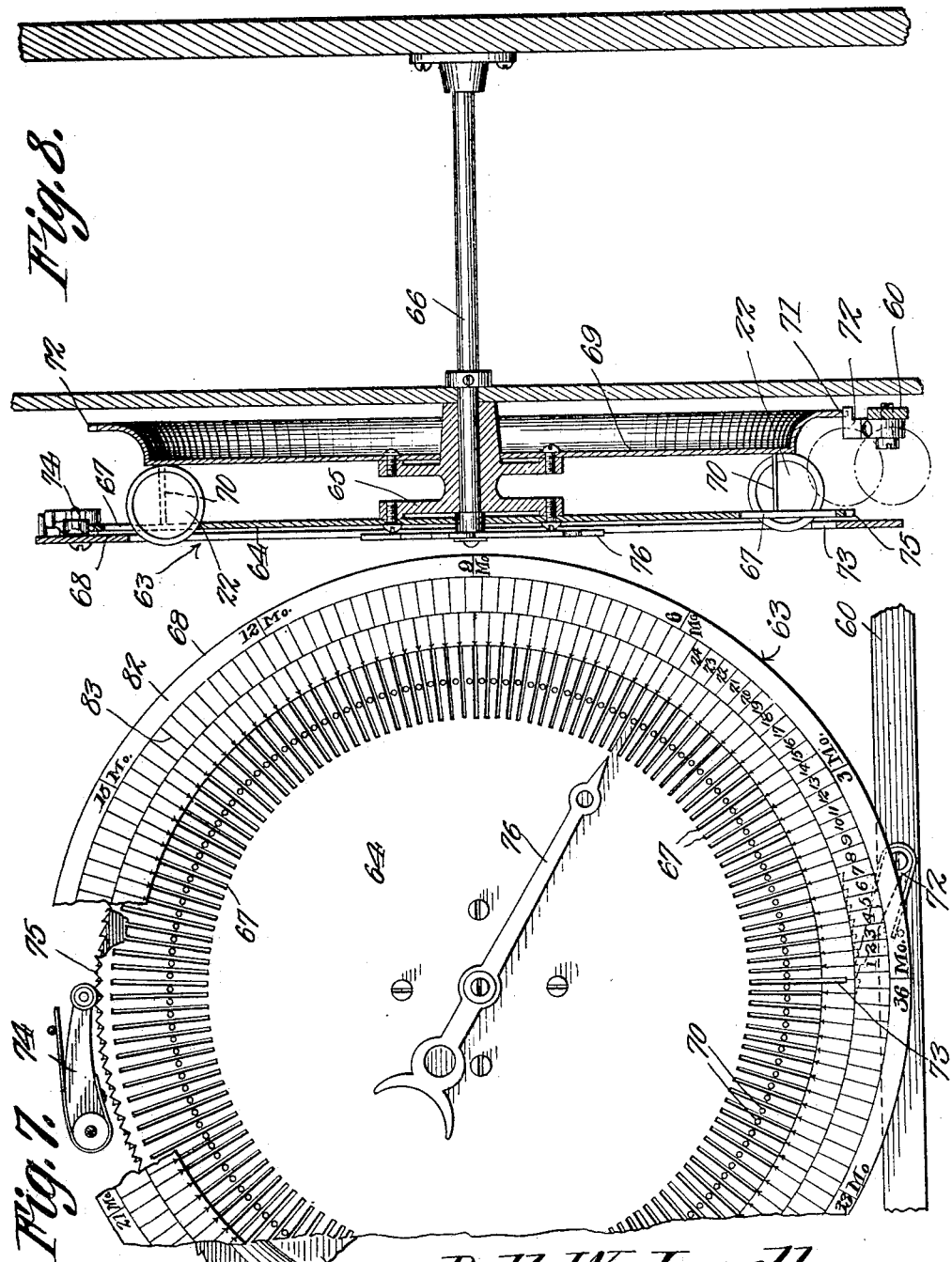

UNITED STATES PATENT OFFICE.

DELL W. JEWELL, OF KALAMAZOO, MICHIGAN.

AUTOMATIC MECHANISM FOR RECALLING CHRONOLOGICAL DATA.

1,117,675. Specification of Letters Patent. Patented Nov. 17, 1914.

Application filed February 18, 1914. Serial No. 819,455.

*To all whom it may concern:*

Be it known that I, DELL W. JEWELL, a citizen of the United States, residing at Kalamazoo, in the county of Kalamazoo and State of Michigan, have invented a new and useful Automatic Mechanism for Recalling Chronological Data, of which the following is a specification.

This invention relates to automatic mechanism for recalling chronological data.

An object of the present invention is to provide a mechanism which will automatically recall chronological data at the expiration of a predetermined lapse of time.

A further object is to provide a time controlled mechanism to be used as, or in connection with, a filing system, whereby due notice will be given of the expiration of a given lapse of time and thus may be used in connection with a prison, automatically indicating that the sentence of a given prisoner or prisoners has expired.

A further object is to provide a mechanism of the class indicated which may be advantageously used in publishing houses, giving due notice that the time for printing a given advertisement has expired, or of the expiration of a subscription or subscriptions. The mechanism may also be advantageously used for recalling engagements, the start and expiration of a given period and in fact numerous other uses in which time enters as one of the determining factors.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 1 is a front view in elevation of my improved mechanism, disclosing the master clock, and the daily and weekly dials. Fig. 2 is a front view of the daily denoting mechanism with a spring motor for the actuation thereof. Fig. 3 is a vertical sectional view taken through the median line of Fig. 2. Fig. 4 is a top plan view of the same. Figs. 5 and 6 represent the mechanism carried by the master clock, controlling the daily and weekly notice giving mechanism. Fig. 7 is a detail view of the weekly notice giving mechanism. Fig. 8 is a cross sectional view thereof.

Referring to the drawings in which similar reference numerals designate corresponding parts throughout the several views, a casing or cabinet 9 houses and protects the mechanism and which cabinet is provided with glass doors as shown, which are normally retained in a closed and locked position.

The master clock 10 drives an eccentric 11 through the intervention of suitable gears 12, 13, 14 and 15, the gear ratio being such, that, the eccentric will make one complete revolution each forty-eight hours to thus raise and lower the eccentric rod 16 once during each twenty-four hours, thus requiring a period of forty-eight hours to complete one cycle.

A daily notice giving or indicating mechanism 17 includes the dial 18 around which extends the rim 19 which is coplanar therewith. The dial 18 is provided with a plurality of radial slots 20 extending in from the outer peripheral edge thereof and in the present mechanism the dial is provided with thirty one of the said slots, there being one for each day in the longest calendar months. Extending in back of the slots and carried by the dial are the receptacles 21, there being one receptacle for each slot and which receptacles are adapted to receive the tabs or checks 22 therein and which will be so held by the rim 19. The rim 19 is provided with a single slot 23 extending therein slightly larger than the slots 20 and which provides for the releasing of the tab or check 21 when the particular slot in which the tab or check is installed comes in registration with the releasing slot 23.

The dial 18 is moved one thirty-first of a complete revolution each day of twenty-four hours and in order to automatically accomplish this, a spring motor or actuating mechanism 24 is provided. The spring motor includes the frame 25 which is secured to a structure by the supporting base 26. A coiled spring 27 is mounted upon the shaft 28 which latter projects through the dial 18 and is provided with a key engageable end 29 whereby the spring coil may be wound. A ratchet wheel 30 is rigidly secured to the shaft or arbor 29 and coöperating with which is the spring pressed pawl 31, the latter being carried by a cam 49. The gear 32 is rigidly secured to and drives the sleeve 33, upon which sleeve is also mounted the spider 34 carrying the dial 18. The gear 32 meshes with and drives a gear 35 which has mounted thereon the shaft 36 in common with the gear 37. A retarding mechanism meshes with the gear 37 and includes a fan 38 which therefore prevents excessive speed of the shaft 36 and minimizes the shocks and jolts incident to a releasing of the motor in order to turn the dial through an arc of one thirty-first of its circumference. The shaft 36 is provided with an arm 39, from the extremity of which projects the pin 40. A reciprocating member 41 is provided with the outstanding ledges 42, the spacing of which is relatively less than the diameter of the circle described by the pin 40. The reciprocating member with the outstanding ledges or shoulders 42 is arranged in the path of travel of the pin 40 and is pivotally connected to and reciprocated by the eccentric 16.

From the foregoing it will be apparent that when the reciprocating member is either raised or lowered to negotiate one half of its cycle, the shaft 36 and arm 39 will rotate through one half of a revolution or 180°, which due to the gear ratio between the gears 32 and 36, corresponds to a movement of the dial equal to one thirty-first of its circumference. Thus a complete cycle of operation of the eccentric 16 corresponds to a period of two days, forty-eight hours, and provides for a movement of the dial through two spaces represented by the distance between successive slots.

A frame 43 is provided with suitable apertures 44 therein reciprocatingly mounting the member 41 and constraining the same to rectilinear motion. The frame 43 is carried by the arm 44' which is pivotally secured as at 45 to the motor frame 25. A spring 46 is also secured to the arm 44' and holds the arm in forced contact with the frame as illustrated at 47. The outer extremity of the arm is provided with the stem 48' carrying the knob 48 by means of which the arm may be forcibly rotated about the pivotal mounting 45 thereof, which will bring the shoulders or ledges 42 out of the path of motion of the pin 40, allowing for the free rotation of the arm 39 and shaft 36.

Thus, should it be desired to set the daily notice giving mechanism 17, this may be accomplished by pushing the knob 48 rearwardly, allowing for the free rotation of the shaft 36 and therefore for the free rotation of the dial 18. The step by step releasing mechanism is also moved out of its normal position at the expiration of those months which contain less than thirty one days.

The cam wheel 49 is rigidly secured to the sleeve 33 and is provided with four projections or bosses 50 which contact with the roller 51 of the cam actuated lever 52 to rotate the latter through a limited arc, four times during each revolution of the sleeve 33 and therefore the dial 18. The cam actuated lever 52 is pivotally mounted as at 53 to the motor frame 25 and is provided with the offset end arm 54 carrying at its extremity the roller 55. The roller 55 contacts with and moves the oscillating frame 56, which frame as illustrated in Fig. 1, includes the depending or swinging bars 57 located at opposite extremities and depending from the top of the cabinet 9. The oscillating frame 56 includes the lower horizontally extending bar 58 which is pivotally secured to the lower extremities of the depending bars 57 and to which are secured the upright posts 59 carrying the cross members 60. Suitable guides 61 prevent any side motion of the frame and a spring 62 presents a suitable reactive force, normally holding the frame in position in contact with the roller 55 and therefore with the cam lever contacting with the peripheral surface of the cam wheel 49.

From the foregoing it will be apparent that the frame 56 will be oscillated four times during one revolution of the dial 18, which will therefore oscillate the frame four times during each month.

Mounted within the cabinet 9 is a plurality of weekly notice giving mechanisms 63, all of which, however, are identical and a detail of one of which is illustrated in Figs. 7 and 8. The weekly notice giving mechanism includes a dial 64 which is rotatably mounted with the spider 65, the latter being carried by the supporting shaft 66. The dial 64 is provided with one hundred and fifty six radially extending slots 67 which correspond to a period of three years. A rim 68 is spaced a slight distance in advance of the rotating dial 64 and provides the closure for the lower open ends of the slots. A rear plate 69 is rigidly secured to the dial 64 and is mounted on the same spider therewith. A plurality of pins 70 extend between the rear plate 69 and dial 64 and hold the tabs or checks 22 in an upright position and in proper spaced relation. The rear plate 69 is formed with the ratchet wheel edge 71 which is engageable by the spring pressed pawl 72, the latter being pivotally carried by the oscillating frame 56. The number of teeth upon the ratchet wheel will correspond to the number of slots in the dial so that each complete cycle of operation of the frame will move the dial through a distance equal to the spacing of the slots and will thus bring each slot successively into registration with the releasing opening 73 with which the rim 68 is provided.

In order to insure that the dial will rotate through the proper distance when actuated by the movements of the oscillating frame, the spring pressed dog 74 is provided and contacts with the serrated or notched edge 75 of the dial. The dial is provided with a notch or serration corresponding to each slot as illustrated in the upper portion of Fig. 7. A pointer 76 is frictionally mounted upon the shaft 66 and is used as a reference to indicate that a new tab or check has just been inserted in a certain slot or it may be used to denote a slot from which a tab or check has been temporarily removed, thus providing for the proper reinsertion thereof.

The mechanism as illustrated in the present drawing has been designed primarily for releasing at certain and predetermined intervals, tabs or checks which are provided with suitable data thereon, and the mechanism is so arranged that the tabs will be released at certain days or weeks. The weekly notice giving mechanism 17 is provided with a pointer 77 which moves over the graduated scale 78 and indicates the day of the month. A second scale 79 is inscribed upon the rim 19 and is graduated from the slot 23 as zero, with the graduations progressing in an opposite direction to the movements of the dial. Thus when it is desired to call up certain information at a date four days from the present time, a check or tab bearing the required information or a reference thereto, is inserted in a slot adjacent the numeral 4 upon the scale 79. It is to be noted in this connection that when a check or tab is inserted within a slot, it passes to the rear of the receptable and will remain so positioned until the particular receptacle within which the tab is residing comes into registration with the slot 23 at which time it will drop directly therethrough. Thus it will be apparent that due to the horizontal disposal of the dial carrying shaft, it provides that the checks or tabs having been once positioned within the receptacle will not tend to roll toward the front portion thereof which would result in their accidental escapement. The master clock will step by step, release the spring motor, moving the dial one space each day so that at the expiration of the four days, the slot within which the tab or slot is located will register with the slot 23 provided for releasing the tab or check from the slot or receptacle, which will drop down into the drawer 80 as illustrated in Fig. 1. A scale 81 may be inscribed directly upon the dial so that if it is desired to call up certain data or information at a certain day of the month, this may be accomplished by inserting the tab or check into the slot adjacent the required day as indicated by the scale 81. If, for any reason, the daily notice giving mechanism marks the wrong date, it may be corrected by moving the knob 48, allowing the dial to rotate until the proper position is obtained.

Inasmuch as the dial and therefore the cam wheel will make one complete revolution during each calendar month and that a calendar month is represented by thirty one spaces, the weekly notice giving mechanism will be oscillated four spaces during each month. Inasmuch as there are more than twenty-eight days to each average month, the dial 64 will be allowed to rotate until it has a lag of one week, when it will be advanced one notch, thus correcting the discrepancy. The rim 68 of the weekly notice giving mechanism is provided with the monthly scale 82 inscribed thereon and the weekly scale 83. Thus when it is desired to call attention to the fact that, we will say 16 weeks have expired from the present date, the tab will be inserted in the slot in the dial 64 adjacent the numeral 16 on the scale 83, and which scale it might be stated is graduated from a zero reference point adjacent the releasing slot 73. When it is desired to call up certain data on a given day more than thirty one days in advance, the tab is inserted in the weekly notice giving mechanism and when released therefrom will then be inserted in the daily notice giving mechanism as it is thought will be readily apparent. A plurality of the weekly notice giving mechanisms have been provided in order to prevent an excessive number of tabs or checks being placed in a single slot or receptacle. The tabs from the weekly notice giving mechanism drop down into the drawers 84. A plurality of guiding shelves 85 are situated below the various dials and guide the inserted tabs into the drawers 84 as will be apparent by a reference to Fig. 1 of the drawings.

From the foregoing it will be noted that the arrangement herein described may be utilized when any sequential and cyclical operation or events take place and suitable scales may be graduated accordingly. The tabs will ordinarily contain a reference to an index filing system or may contain the required notations directly inscribed thereon.

It will be readily apparent that should it be so desired the releasing slots 23 and 73 can be omitted, in which case the tabs or tags will be manually withdrawn from their retaining receptacles rather than automatically released therefrom.

Having thus fully described my invention, what I claim is:—

1. In a machine of the class described, the combination of a rotating mechanism including a plurality of receptacles for the reception of articles therein, means for intermittently rotating the said mechanism for the successive discharging of said articles from said receptacles, said intermittent rotating means including time controlled features, and a second rotating mechanism including a plurality of receptacles for the reception of articles therein and intermittently rotated by the aforementioned rotating mechanism for the successive discharge of the said articles from the said receptacles.

2. In a mechanism of the class described, the combination of a master clock, a rotating member, means carried by said rotating member for the storing and successive discharging of articles, means controlled by said master clock for intermittently fractionally rotating the said rotating member, and a second rotating member including means for storing and successively discharging articles, intermittently and fractionally rotated by the aforementioned rotating member.

3. In a mechanism of the class described, the combination of a master clock, a rotating member storing and successively discharging articles therefrom, controlled by said master clock and making a complete cycle in one month, and a plurality of moving members adapted to store and successively discharge articles therein and therefrom, said second mentioned moving members actuated by the first mentioned moving member and successively discharging articles therefrom at the expiration of each calendar week.

4. In a mechanism of the class described, the combination of a master clock, a rotatable mechanism with means for storing and successively discharging articles, a motor operably connected with said rotatable mechanism, an escapement controlling the movements of said motor and controlled by said master clock, and a second rotatable mechanism with means for storing and successively discharging articles, actuated by the rotation of the first mentioned rotatable mechanism.

5. A mechanism for automatically recalling chronological data, comprising a rotatable mechanism, means carried thereby for the reception and successive discharge of articles, means for intermittently rotating the said mechanism, said intermittent rotating means including time controlled features, and a second rotatable mechanism including means for the storing and successive discharge of articles, said second mentioned rotatable mechanism intermittently rotated by the aforementioned intermittently rotating mechanism.

6. In a mechanism for automatically recalling chronological data, the combination of a master clock, a motor, a rotatable member driven thereby, an escapement for said motor controlled by said master clock, means carried by said rotatable member for the storing and successive discharging of articles, and a second rotatable member including means for storing and successively discharging articles, and means engaging the first mentioned rotatable mechanism and the second mentioned rotatable mechanism for the actuation of the latter, said means allowing the second mentioned rotatable mechanism to be manually moved in a forward direction.

7. A mechanism of the class described, comprising a master clock, an eccentric uniformly driven thereby, an escapement reciprocated by said eccentric, a rotatable member including means for storing and successively discharging articles therefrom, a motor connected to and adapted to rotate said rotatable member, the movements of said motor controlled by said escapement, and means for moving said escapement out of operable relation with the said motor, allowing the free rotation thereof and the continuous rotation of said rotatable member.

8. In a mechanism of the class described, the combination of a master clock, a rotatable member including means for storing and discharging articles therefrom, means controlled by said master clock intermittently and fractionally rotating said rotatable member, a plurality of rotatable members, a swinging frame with means engaging the last mentioned rotatable members for the fractional rotation thereof during each oscillation of said swinging frame, and means engaging the first mentioned rotatable member and said swinging frame adapted to intermittently oscillate the same.

9. In a mechanism of the class described, a master clock, a rotatable member, intermittently rotating means for storing and successively discharging articles therefrom, said rotating means controlled by said master clock, and a second rotatable means for storing and successively discharging articles therefrom, and means driven by said first mentioned rotating means engaging and driving the second mentioned rotatable means, said driving means allowing for the free forward manual rotation of said second mentioned rotatable means.

10. In a mechanism of the class described, a master clock, a rotatable member, intermittently rotating means for storing and successively discharging articles therefrom, said rotating means controlled by said master clock, a second rotatable means for storing and successively discharging articles therefrom, means driven by said first mentioned rotating means engaging and driving the second mentioned rotatable means, said driving means allowing for the free forward manual rotation of said second mentioned rotatable means, and a dog engaging the said second mentioned rotatable means resiliently constraining the same to fractional rotation.

In testimony that I claim the foregoing as my own, I have hereto affixed my signature in the presence of two witnesses.

DELL W. JEWELL.

Witnesses:
A. B. TITUS,
FRANK W. CAIN.

Copies of this patent may be obtained for five cents each, by addressing the "Commissioner of Patents, Washington, D. C."